(12) United States Patent
Saito et al.

(10) Patent No.: US 6,528,899 B1
(45) Date of Patent: Mar. 4, 2003

(54) POWER SUPPLY NETWORK APPARATUS

(75) Inventors: Hiroyuki Saito, Hitachinaka (JP); Mitsuru Koni, Hitachinaka (JP); Yuichi Kuramochi, Hitachinaka (JP); Tatsuya Yoshida, Ibaraki-ken (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/464,405

(22) Filed: Dec. 16, 1999

(30) Foreign Application Priority Data

Dec. 18, 1998 (JP) .......................................... 10-361385

(51) Int. Cl.[7] ................................................. H02G 3/00
(52) U.S. Cl. ...................... 307/10.1; 307/9.1; 307/10.6; 307/10.8; 340/310.01
(58) Field of Search ............................ 307/10.1, 38, 11, 307/9.1, 12, 30, 10.6, 10.8; 340/310.01

(56) References Cited

U.S. PATENT DOCUMENTS

| | | | |
|---|---|---|---|
| 5,614,883 A | * 3/1997 | Dery et al. ................. | 340/458 |
| 5,640,055 A | 6/1997 | Sugiyama et al. | |
| 5,808,371 A | * 9/1998 | Kon'i et al. ................ | 307/10.1 |
| 5,818,122 A | * 10/1998 | Miyazawa et al. ......... | 307/10.7 |
| 5,989,350 A | * 11/1999 | Hirano ........................ | 307/9.1 |
| 5,990,570 A | * 11/1999 | Yoshida et al. ............ | 307/10.1 |

FOREIGN PATENT DOCUMENTS

EP 0812049 12/1997

OTHER PUBLICATIONS

"520I, 525I, 530I, 538I, 524TD, Notice D'Utilisation" BMW, 1989.
Copy of the Search Report.

* cited by examiner

*Primary Examiner*—Stephen W. Jackson
*Assistant Examiner*—Robert L. Deberadinis
(74) *Attorney, Agent, or Firm*—Crowell & Moring LLP

(57) ABSTRACT

A battery is disposed at the portion beneath the rear seat of a vehicle. The positive electrode of the battery is connected through a power bus for power supply to a rear junction block (R-JB). A rear integration module (RIM) can be coupled to the R-JB through a plug-in operation. The positive electrode of the battery is also connected through a power bus to an under dash junction block (UD-JB). A body control module (BCM) can be coupled to the UD-JB through a plug-in operation. The power bus connection terminal of the UD-JB is connected to a fuse relay block (F-JB) through a power bus. A front integration module (FIM) can be coupled to the F-JB through a plug-in operation. The power bus connection terminal of the F-JB is connected to a starter motor through a power supply line and further connected to an alternator through a power supply line from the starter.

16 Claims, 12 Drawing Sheets

POWER SUPPLY NETWORK APPARATUS

BACKGROUND OF THE INVENTION

The present invention relates to a power supply network apparatus for supplying electric power to electrical loads of an automobile.

Conventionally, a battery mounted on an automobile is usually disposed within an engine room. However, in recent years, in order to improve the distribution ratio of the weight between the front and rear portions of a vehicle or due to the reduction of a space of an engine room, some types of vehicles are arranged to dispose a battery at a portion other than an engine room, for example, a position within a trunk room, a portion beneath a rear seat or the like. In this case, since a starter motor, an alternator, relays and fuses for controlling loads of electrical equipments or the like are disposed within the engine room, such parts within the engine room are respectively connected to the battery through long and thick cables.

BRIEF SUMMARY OF THE INVENTION

Since the distance from the trunk room or the portion beneath the rear seat to the engine room is long, there arises a problem in the prior art that the number of wires increases and the wire harness becomes thicker in the vehicle, which results in the increase of the weight of the vehicle and the degrade of a fuel cost.

Accordingly, an object of the present invention is to provide a power supply network apparatus which can obviate the aforesaid problem of the prior art.

Another object of the present invention is to provide a power supply network apparatus which can reduce the number of wires and prevent the wire harness from being thicker even when a battery is disposed at a position away from an engine room such as a position within a trunk room, a position beneath a rear seat or the like.

(1) In order to attain the aforesaid object, the present invention is arranged in a manner that in a power supply network apparatus used in a vehicle in which a battery is mounted at a position away from an engine room, the power supply network apparatus includes a plurality of power supply centers disposed dispersedly; and a power bus for supplying electric power from the battery to a first one of the plurality of power supply centers and supplying electric power from the first one of the plurality of power supply centers to a second one of the plurality of power supply centers.

According to such a configuration, since the electric power is supplied through the power supply centers from the battery, the number of wires used in the vehicle can be reduced.

(2) In the aforesaid feature (1), preferably, a starter is supplied with electric power from one of the plurality of power supply centers which is near to the starter.

According to such a configuration, a wire harness can be prevented from being thicker in the vehicle.

(3) In the aforesaid feature (1), preferably, each of the plurality of power supply centers is formed by a control module having a semiconductor switching element serving as a load driving means and a relay block having a relay serving as a load driving means.

(4) In the aforesaid feature (3), preferably, the control module and the relay block of each of the plurality of power supply centers is connectable and separable to each other by means of a connector.

(5) In the aforesaid feature (3), preferably, the relay block includes a protection means for protecting a load at a time of short-circuit of the load and at a time where a power supply line to the load is short-circuited to ground.

(6) In the aforesaid feature (3), preferably, a driving signal is sent to the load driving means in a multiplexed communication mode.

DETAILED DESCRIPTION OF THE INVENTION

A power supply network apparatus according to a first embodiment of the present invention will be explained with reference to FIGS. 1 to 10.

First, the arrangement of a power supply center in the power supply network apparatus according to the first embodiment will be explained with reference to FIG. 1.

Figure 1:
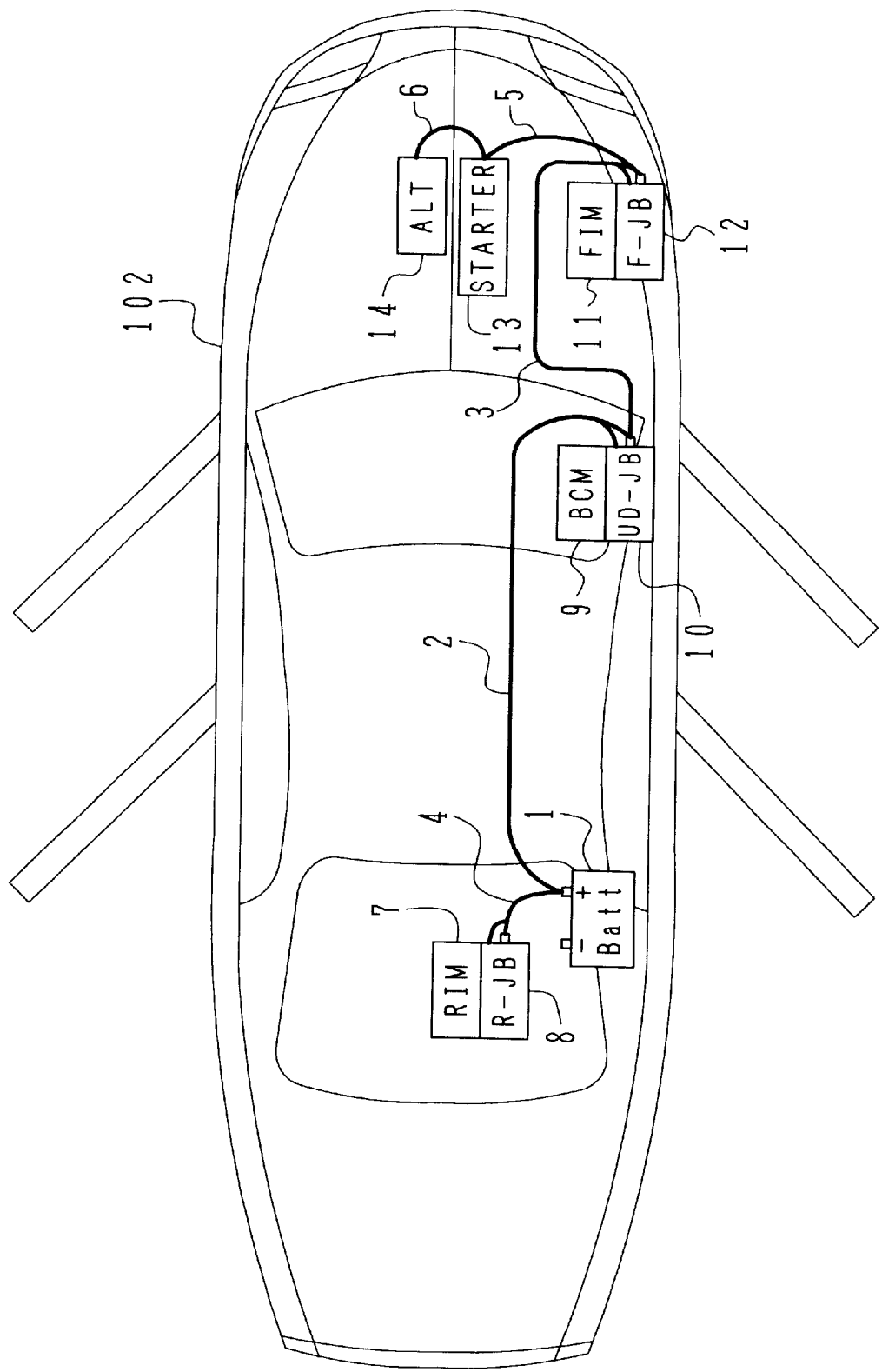
FIG. 1 is a block diagram showing the arrangement of the power supply center in the power supply network apparatus according to a first embodiment of the present invention.

FIG. 1 is a block diagram showing the arrangement of the power supply center in the power supply network apparatus according to the first embodiment.

In this embodiment, a battery 1 is disposed at the portion beneath the rear seat of a vehicle 102. The battery 1 may be disposed within a trunk room of the vehicle 102.

The positive electrode of the battery 1 is connected through a power bus 4 for power supply to a rear junction block (hereinafter referred to as an R-JB) 8 serving as a fuse relay block having fuses and relays for driving large-current loads. The detailed configuration of the R-JB 8 will be explained later with reference to FIG. 9. A rear integration module (hereinafter referred to as RIM) 7 serves to control the input operations of the switches of the trunk room and both rear doors and also control the driving operations of the loads of the electric equipments thereof. The RIM 7 is disposed in adjacent to the R-JB 8 and can be coupled to the R-JB 8 through a plug-in operation. The R-JB 8 and the RIM 7 constitute the power supply center for the loads in the vicinity of the rear seat. The detailed configuration of the RIM 7 will be explained later with reference to FIG. 10. The connecting relation between the R-JB 8 and the RIM 7 will be explained later with reference to FIG. 4.

The positive electrode of the battery 1 is also connected through a power bus 2 for power supply to an under dash junction block (hereinafter referred to as an UD-JB) 10 serving as a fuse relay block. The detailed configuration of the UD-JB 10 will be explained later with reference to FIG. 7. A body control module (hereinafter referred to as a BCM) 9 serves to control the input operations of the switches and the driving operations of the loads of the electric equipments of a cabin. The BCM 9 is disposed in adjacent to the UD-JB 10 and can be coupled to the UD-JB 10 through a plug-in operation. The detailed configuration of the BCM 9 will be explained later with reference to FIG. 8. The UD-JB 10 and the BCM 9 constitute the power supply center for the loads around the cabin in the vicinity of the center portion of the vehicle.

The power bus connection terminal of the UD-JB 10 is connected through a power bus 3 for power supply to a front junction block (hereinafter referred to as a F-JB) 12 serving as a fuse relay block disposed within the engine room. The detailed configuration of the F-JB 12 will be explained later with reference to FIG. 5. A front integration module (hereinafter referred to as a FIM) 11 serves to control the input operations of the switches and the driving operations of the loads of the engine room. The FIM 11 is disposed in adjacent to the F-JB 12 and can be coupled to the F-JB 12 through a plug-in operation. The detailed configuration of the FIM 11 will be explained later with reference to FIG. 6. The F-JB 12 and the FIM 11 constitute the power supply center for the loads in the vicinity of the cabin of the engine room at the front portion of the vehicle.

The power bus connection terminal of the F-JB 12 is continuously connected to a starter motor 13 and an alternator 14 through power supply lines 5, 6.

Each of the power buses 2, 3 and 4 has a second conductive layer disposed at the center portion between the inner side of an outer sheath thereof and a wire for supplying electric power. As to each of the power buses, it is possible to detect a body earth short-circuit state of the power bus so long as an intermediate voltage between a battery voltage and a ground voltage is supplied to the second conductive layer and the intermediate voltage is monitored. In the present embodiment, the second conductive layer in each of the power buses is called as a "short sensor".

The arrangement of a control unit for controlling the vehicle (hereinafter called vehicle control unit) used in the first embodiment will be explained with reference to FIG. 2.

Figure 2:
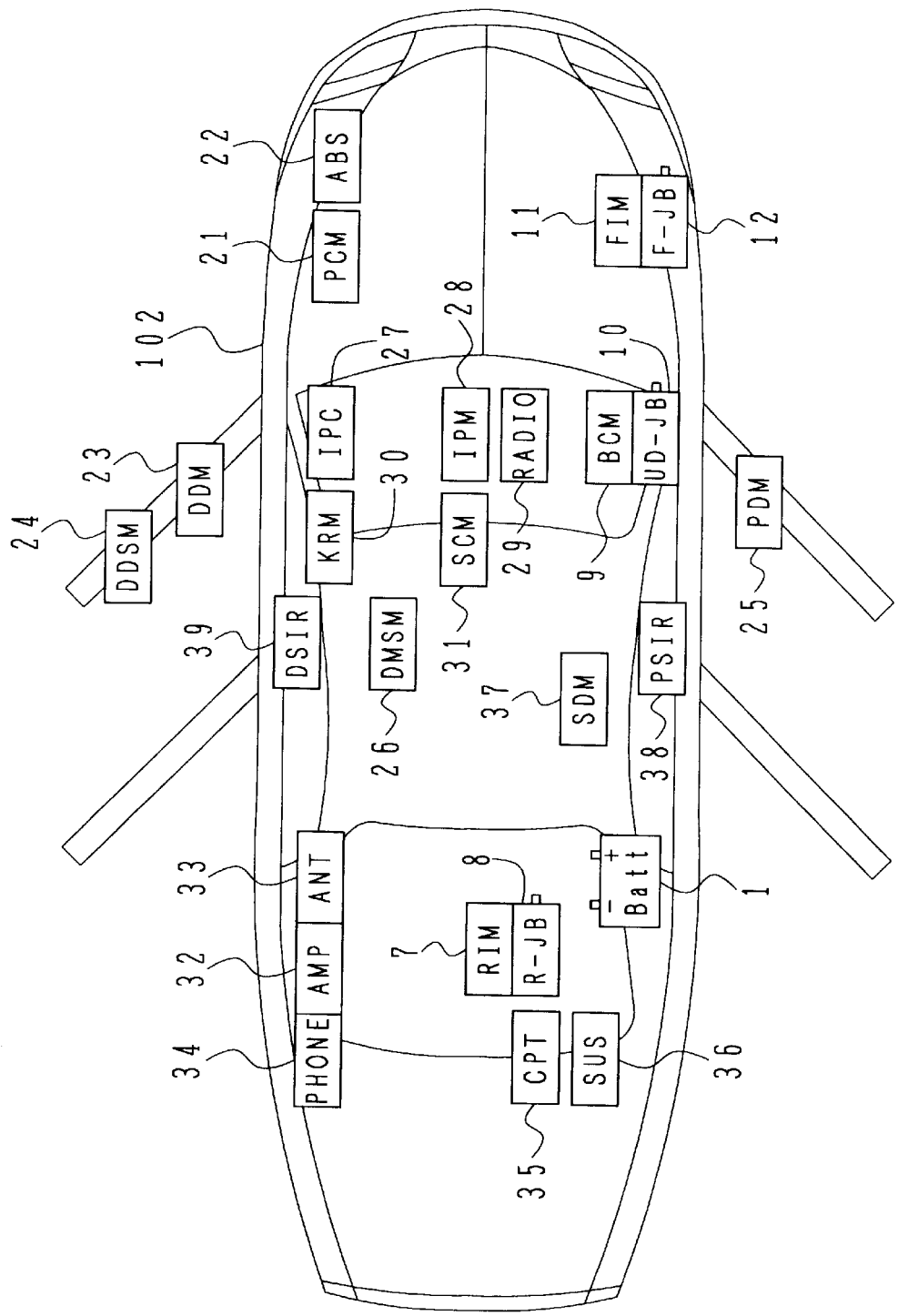
FIG. 2 is a block diagram showing the arrangement of the vehicle control unit in the power supply network apparatus according to the first embodiment.

FIG. 2 is a block diagram showing the arrangement of the vehicle control unit in the power supply network apparatus according to the first embodiment.

The vehicle control unit in the first embodiment includes a power train control module (hereinafter referred to as a PCM) 21 for totally controlling the loads of the electric equipments of the vehicle, the engine and the transmission; an antilock brake system (hereinafter referred to as an ABS) control unit 22; a drive door module (hereinafter referred to as a DDM) 23 for controlling the loads of the electric equipments of a driver's seat side door; a driver's seat side switch module (hereinafter referred to as a DDSM) 24; a passenger door module (hereinafter referred to as a PDM) 25 for monitoring the control of the loads of the electric equipments and the switch inputs at the passenger seat side door; a driver memory seat module (hereinafter referred to as a DMSM) 26 for controlling an electrically driven seat at the driver's seat side; an instrument panel cluster (hereinafter referred to as an IPC) 27 for a meter panel module; an instrument panel module (hereinafter referred to as an IPM) 28 for monitoring the control of the air conditioner and the switch inputs around the instrument panel; a car radio 29; a key read module (hereinafter referred to as a KRM) 30 for an ignition key for preventing burglary; a sunroof control module (hereinafter referred to as a SCM) 31; an audio amplifier 32; an audio antenna amplifier 33 for an audio antenna; an automobile telephone unit 34; a cellular phone transceiver (hereinafter referred to as a CPT) 35 serving as the antenna unit of the automobile telephone; a suspension control unit 36; a sensing diagnostic module (hereinafter referred to as a SDM) 37 serving as an air bag control unit; a passenger seat side air bag module (hereinafter referred to as a PSIR) 38; and a driver's seat side air bag module (hereinafter referred to as a DSIR) 39.

Explanation will be made as to the layout of multiplexed communication bus lines coupled among respective control modules for receiving and transmitting data thereamong in the embodiment with reference to FIG. 3.

Figure 3:
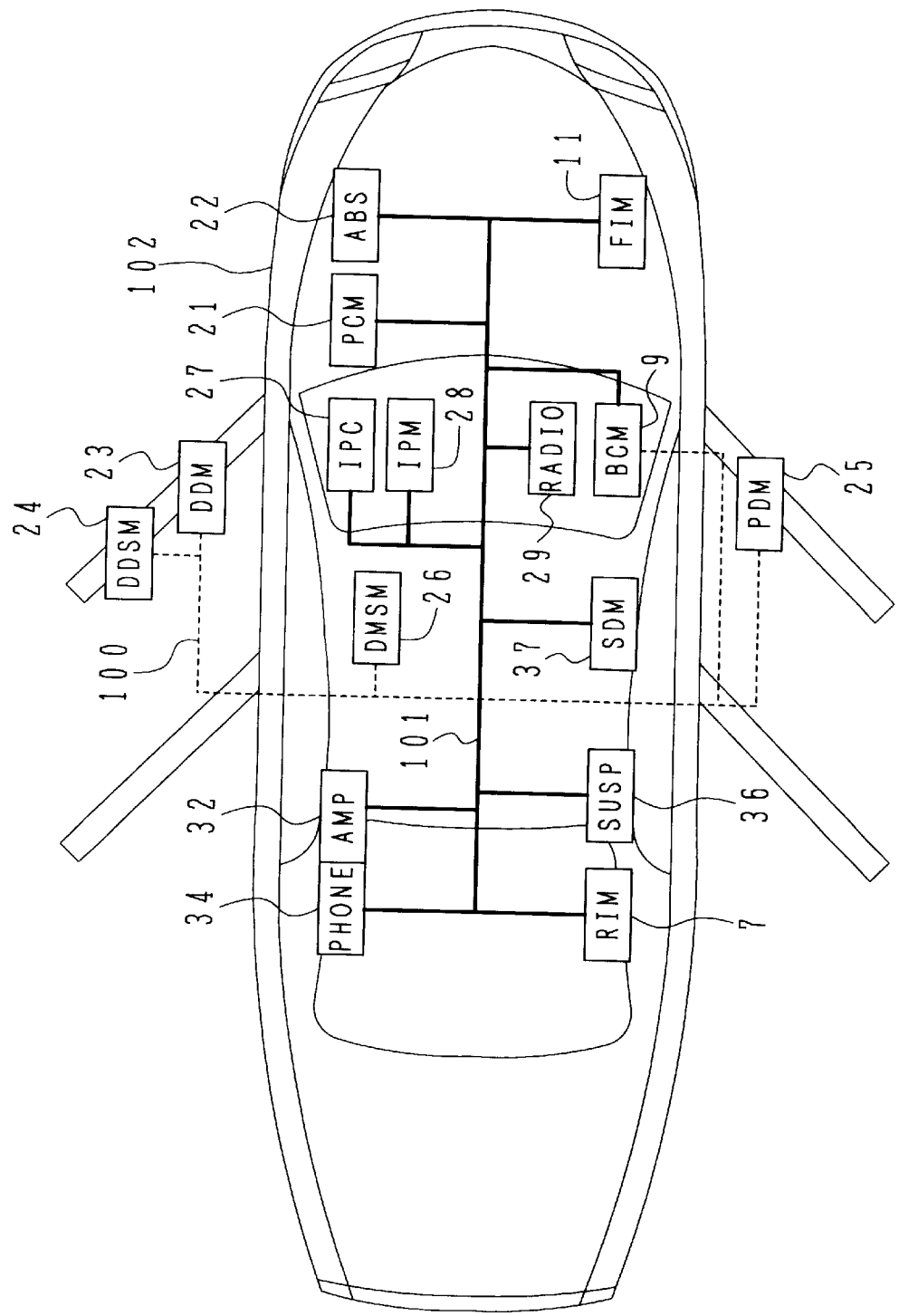
FIG. 3 is a diagram showing the layout of a multiplexed communication bus line according to the first embodiment.

FIG. 3 is a diagram for explaining the layout of the multiplexed communication bus lines in the embodiment.

A multiplexed communication line 101 is disposed among the respective modules shown in FIG. 2, that is, the PCM 21, the ABS 22, the IPC 27, the IPM 28, the radio 29, the audio amplifier 32, the automobile telephone unit 34, the suspension control unit 36, the SDM 37, the RIM 7, the BCM 9 and the FIM 11, and serves to transmit and receive the data necessary for the respective modules.

The DDM 23, the DDSM 24, the PDM 25, the DMSM 26 and the BCM 9 are connected through a multiplexed communication bus 100 dedicated for the control of the electric equipments at the body portion.

The BCM 9 serves as a gateway for the multiplexed communication using both the multiplexed communication line 101 and the multiplexed communication bus 100.

Figure 4:
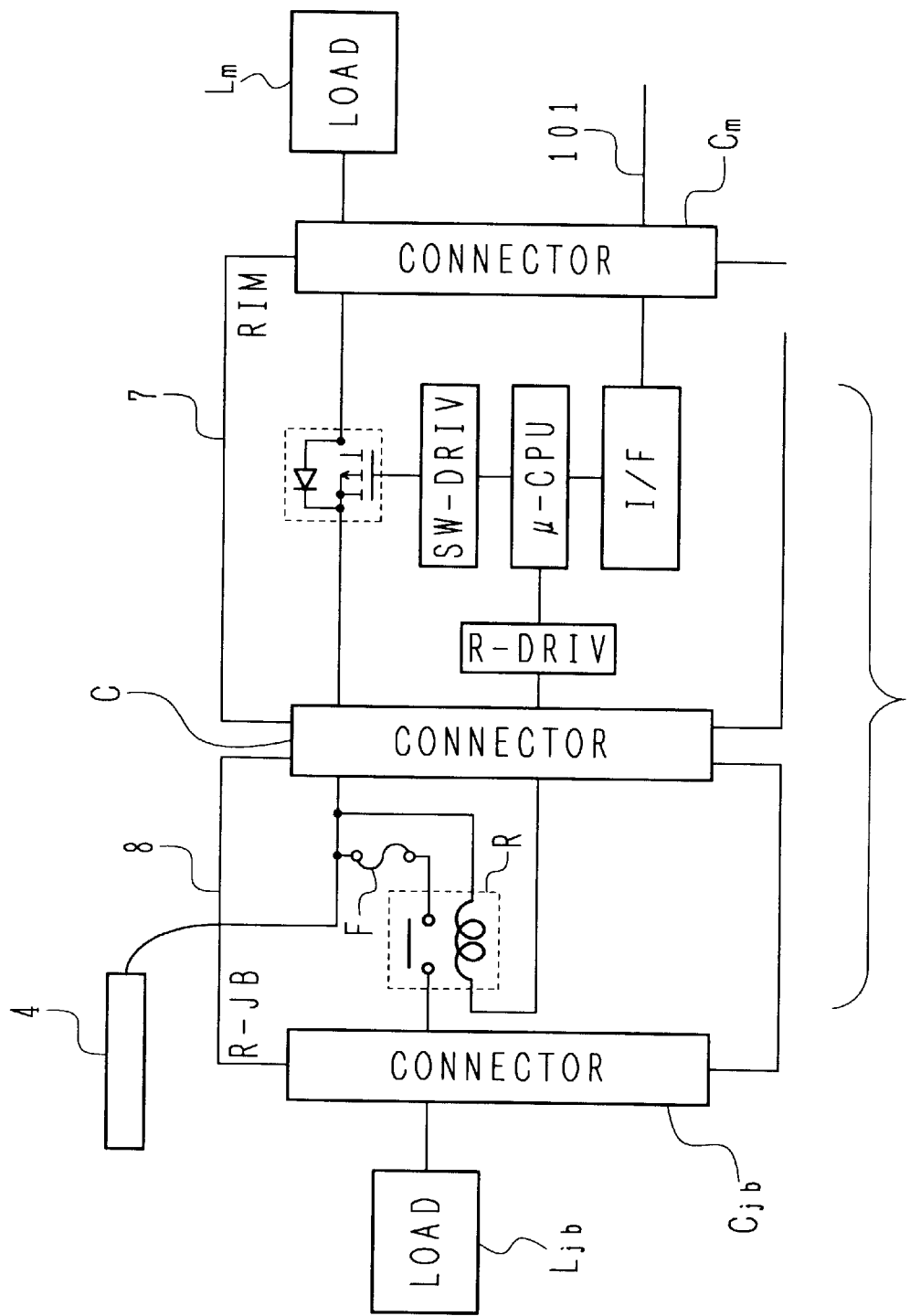
FIG. 4 is a block diagram showing the schematic configuration of a fuse relay block JB and a control module IM used in the power supply network apparatus according to the first embodiment.

The schematic configuration of a fuse relay block JB and a control module IM used in the power supply network apparatus according to the first embodiment will be explained with reference to FIG. 4. In FIG. 4, like parts corresponding to those of FIG. 1 are marked with the same references and therefor need not be described.

FIG. 4 is a block diagram showing the schematic configuration of the fuse relay block JB and the control module IM used in the power supply network apparatus according to the first embodiment.

FIG. 4 shows the rear junction block (R-JB) 8 as an example of the fuse relay block JB and the rear integration module (RIM) 7 as an example of the control module IM. The configuration of each of the under dash junction block (UD-JB) 10, the body control module (BCM) 9, the front junction block (F-JB) 12 serving as a fuse relay block and the front integration module (FIM) 11 is similar to those of FIG. 4.

The R-JB 8 includes a fuse F for driving a large current load Ljb such as a compressor etc. and a relay R. The large current load Ljb is connected to the R-JB 8 through a connector Cjb.

The RIM 7 includes a semiconductor switching element SW for driving a small current load Lm such as a lamp, a small-size motor or the like. The small current load Lm is connected to the semiconductor switching element SW through a connector Cm. The microcomputer μ-CPU of the RIM 7 is connected to the multiplexed communication line 101 through an interface circuit I/F and the connector Cm. The RIM 7 drives the loads Lm and Ljb on the basis of the information and the switch inputs of the trunk room and both the rear doors transmitted through the multiplexed communication line 101. To this end, the RIM 7 includes a switch driving circuit SW-DRIV for making the semiconductor switching element SW conductive and non-conductive and a relay driving circuit R-DRIV for driving the relay R. The microcomputer μ-CPU operates the switch driving circuit SW-DRIV and the relay driving circuit R-DRIV thereby to operate the semiconductor switching element SW and the relay R, whereby electric power is supplied from the power bus 4 to the large current load Ljb and the small current load Lm.

The R-JB 8 and the RIM 7 can be coupled to each other through a connector C by the plug-in operation. The R-JB 8 and the RIM 7 constitute the power supply center for supplying electric power to the loads such as the large current load Ljb and the small current load Lm.

Figure 5:
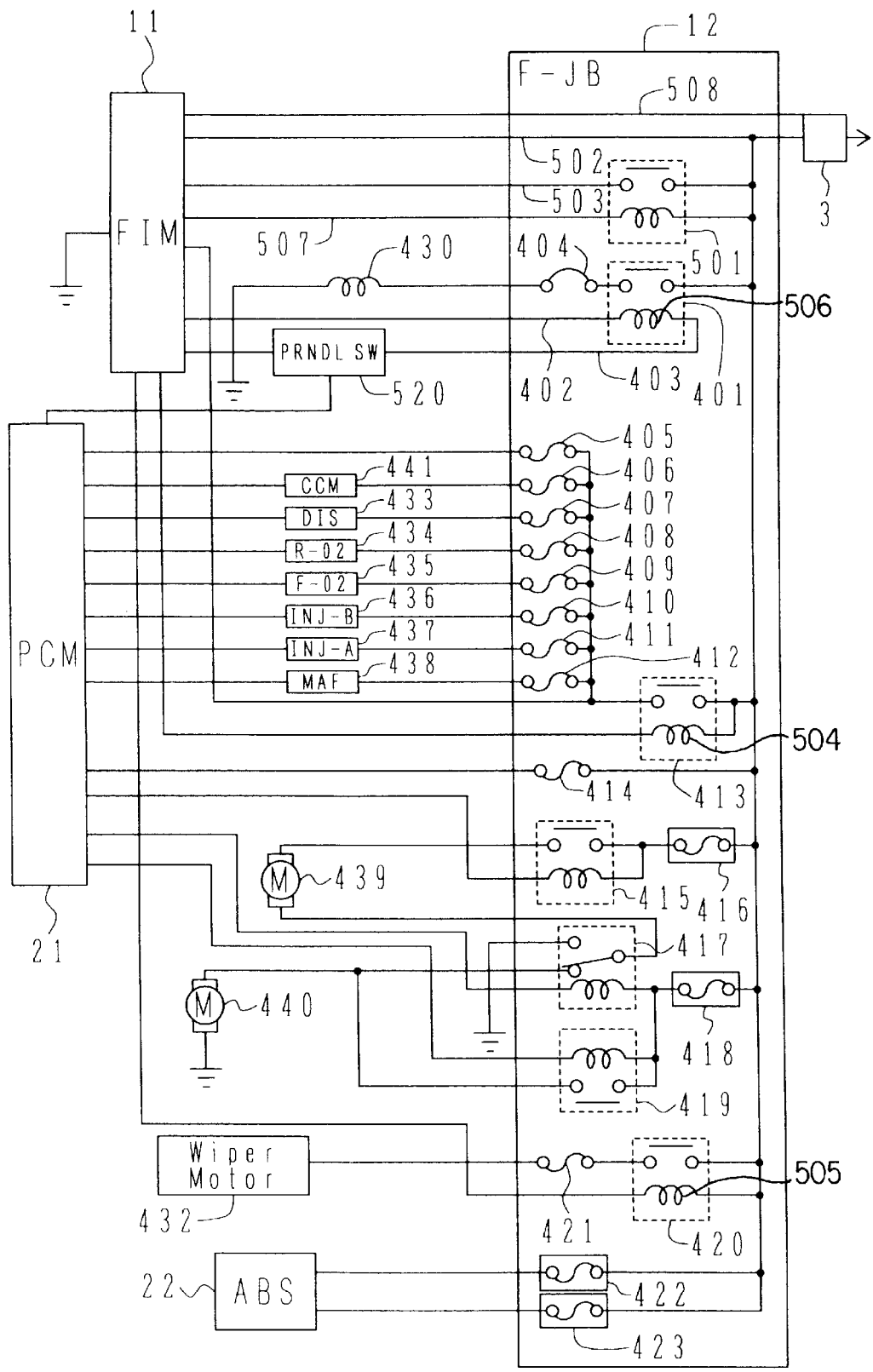
FIG. 5 is a block diagram showing the detailed configuration of an F-JB used in the power supply network apparatus according to the first embodiment and the loads connected to the F-JB.

Then the explanation will be with reference to FIG. 5 as to the detailed configuration of the F-JB 12 used in the power supply network apparatus according to the embodiment and the loads connected to the F-JB 12.

FIG. 5 is a block diagram showing the detailed configuration of the F-JB 12 used in the power supply network apparatus according to the embodiment and the loads connected to the F-JB 12.

The electric power from the power bus 3 is supplied as a power supply 502 of the FIM 11, as power supplies 503 and 507 for driving a relay 501 which prevents a reverse current from flowing to the FIM at the time of reversely connecting the battery and for driving a coil for the relay 501, as power supplies 402 and 403 for driving a starter relay 401 which drives a solenoid 430 for a starter motor magnet clutch, as a power supply for driving an ignition relay 413 which controls the electric power supply to the PCM 21 and for driving a coil for the relay 413, as a power supply for backing up the battery for the PCM 21 connected through a fuse 414, as a power supply for driving driving relays 415, 417, 419 for radiator fan motors 439, 440 and for driving relay coils for these relays 415, 417, 419, as a power supply for driving a relay 420 which drives a wiper motor control circuit 432 and for driving a coil for driving the relay 420, and as a power supply for driving a motor and a solenoid for the ABS 22.

As shown in FIG. 4, since the FIM 11 and the F-JB 12 are disposed adjacently and configured so as to be connectable and separable to each other, there is no wire harness between the FIM 11 and the F-JB 12. Alternatively, the FIM 11 and the F-JB 12 may be configured in a manner that they are integrated so as not to be separable. In this case, also a wire harness between the FIM 11 and the F-JB 12 can be eliminated.

As described later, since the FIM 11 includes therein a function portion for cutting off the power supplied to a load driven by the FIM 11 at the time where the load is short-circuited, it is not necessary to provide within the F-JB 12 a fuse for the load to be driven by the FIM 11.

A short-circuit sensor 508 is applied with a voltage by an interface circuit within the FIM 11 and monitors the voltage. The monitored voltage is used for estimating the grounding state of the power bus.

A circuit breaker 404 is disposed in order to prevent the short-circuit of the starter solenoid 430 and the grounding of the related wire harness. The drive signal for the starter relay 401 is controlled by both the drive signals of the gear position switch 520 disposed at the transmission and the FIM 11.

As described later, the ignition relay 413 is controlled in a manner that the FIM 11 receives the information of the ignition switch which is monitored by the BCM 9 and transmitted in a multiplexed communication mode and then the relay coil for the ignition relay is controlled on the basis of the received information.

The ignition relay 413 is used for controlling the power supply to the PCM 21 itself and the loads to be controlled by the PCM 21, that is, a cruising control module 441, an igniter unit 433, a rear side O2 sensor (oxygen sensor) 434, a front side O2 sensor 435, injectors 436, 437, and an air flow sensor 438 etc. These loads are supplied with electric power through fuses 405, 406, 407, 408, 409, 410, 411 and 412, respectively. The FIM 11 monitors the output of the ignition relay 413 and checks whether the ignition relay 413 is operated normally or not.

The PCM 21 controls the operation state of radiator fun motors 439 and 440 in accordance with the conduction states of relays 415, 417 and 419 in three modes, that is, a mode for operating either one of these motors and a mod for operating these motors in a serially connected sate. These radiator fun motors 439 and 440 are provided with fuses 416, 418 in order to protect them at the time of the short-circuit thereof, respectively. The FIM 11 controls the relay 420 in accordance with the state of the ignition switch thereby to control the current supply to the wiper motor 432. A fuse 421 is provided in order to protect the wiper motor 432 at the time of the short-circuit thereof. In this embodiment, the rotation speed and the intermittent operation of the wiper motor is controlled by a wiper switch itself without using the multiplexed communication mode.

Fuses 422 and 423 are provided in order to protect the ABS 22 at the time of the short-circuit thereof.

Figure 6:
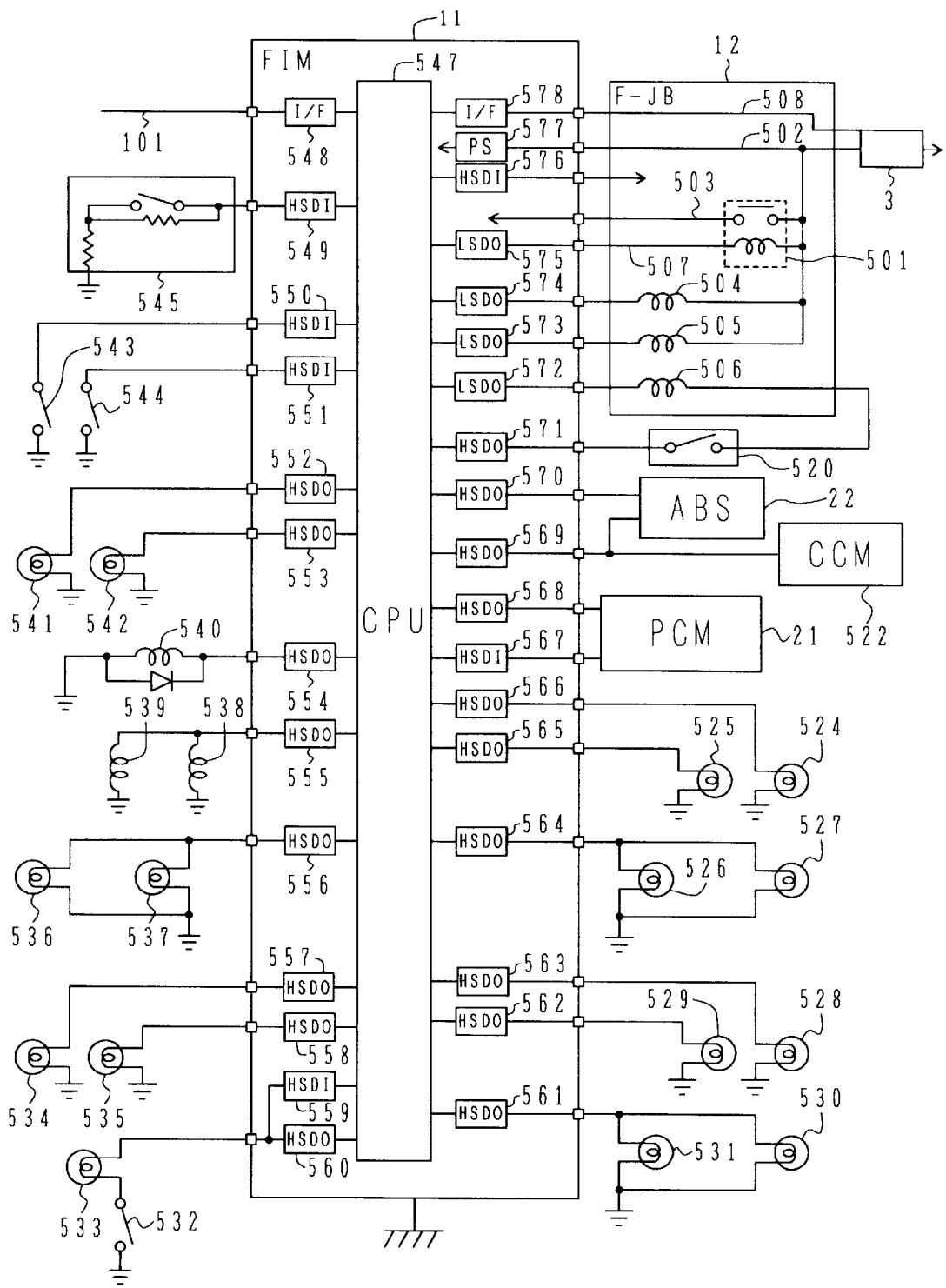
FIG. 6 is a block diagram showing the detailed configuration of an FIM used in the power supply network apparatus according to the first embodiment and the loads and the switches connected to the FIM.

Then the explanation will be with reference to FIG. 6 as to the detailed configuration of the FIM 11 used in the power supply network apparatus according to the embodiment and the loads and the switches connected to the FIM 11.

FIG. 6 is a block diagram showing the detailed configuration of the FIM 11 used in the power supply network apparatus according to the embodiment and the loads and the switches connected to the FIM 11.

The short-circuit sensor 508 is applied with a voltage by the interface circuit 578 within the FIM 11 and monitors the voltage. The monitored voltage is used for estimating the grounding state of the power bus. The normally-turned-on power supply 502 is used for generating a voltage suitable for operating a CPU 547 by a power supply circuit 577 and further generating a wake-up signal for a sleeping state of the system.

The coil of the relay 501 within the F-JB 12 and coils 504, 505 and 506 are driven by driving circuits LSDO (low side discrete output) 575, 574, 573 and 572, respectively. The output of the ignition relay 413 is processed by a processing circuit HSDI (high side discrete input) and taken into the CPU 547.

The PRNDL switch 520 side of the starter relay coil is driven by a HSDO (high side discrete output) 571 in accordance with a burglary prevention signal and an ignition key signal sent in the multiplexed communication mode. The power supply for the ignition switch of the ABS 22 is turned on by a HSDO 570. The brake signal for the ABS 22 and a cruise control module 522 is supplied by a HSDO 569. An ignition switch signal and an air conditioner clutch drive instruction signal for the PCM 21 are generated by a HSDO 568 and a HSDO 567 and inputted, respectively.

The lights etc. at the front portion of the vehicle (that is, left and right side high beam head lamps and low beam head lamps 524, 525, 541, 542, left and right side directional lamps 529, 535, left and right side cornering lamps 528, 534, left and right side marker lamps and parking lamps 526, 527, 536, 537, and left and right side adverse weather lamps 530, 531) are supplied with electric power by driving circuits HSDI 566, 565, 564, 563, 562, 561, 552, 553, 556, 557, 558, respectively. The maintenance lamp 533 within the engine room is supplied with electric power by the driving circuit HSDI 559. Further, since it is necessary to wake up the maintenance lamp when a switch 532 is turned on at the time of the sleeping state of the system, the input circuit HSDI 559 is provided in parallel to a driving circuit HSDO 560.

A driving circuit HSDO 555 for horns 538, 539 controls so as to make the load conductive in accordance with a drive control signal sent in the multiplexed communication mode. An air conditioner compressor clutch 540 is driven by a driving circuit HSDO 554. A control signal for the driving circuit is supplied from the PCM of the HSDI 567. The states of a window washer liquid quantity level switch 543, a cooling water quantity level switch 544 and a brake oil quantity level switch 545 are respectively processed by input processing circuits 550, 551, 549 and taken into the CPU 547, which in turn sends the signals thus processed in the multiplexed communication mode. An interface circuit 548 drives the multiplexed communication line 101 and monitors the state thereof. Since the processing circuit for the protocol of the multiplexed communication is contained within the CPU 547, the interface circuit 548 is provided in order to perform the level conversion and to satisfy the specification of the physical layer of the communication.

Each of the driving circuits HSDOs employs a semiconductor driving apparatus with a overheat turn-off protection function as a driving element. Thus, each of the driving circuits can quickly turn off the driving element at the occurrence of abnormality such as the short-circuit of the corresponding load, the grounding of the wiring etc., so that no fuse is required.

Figure 7:
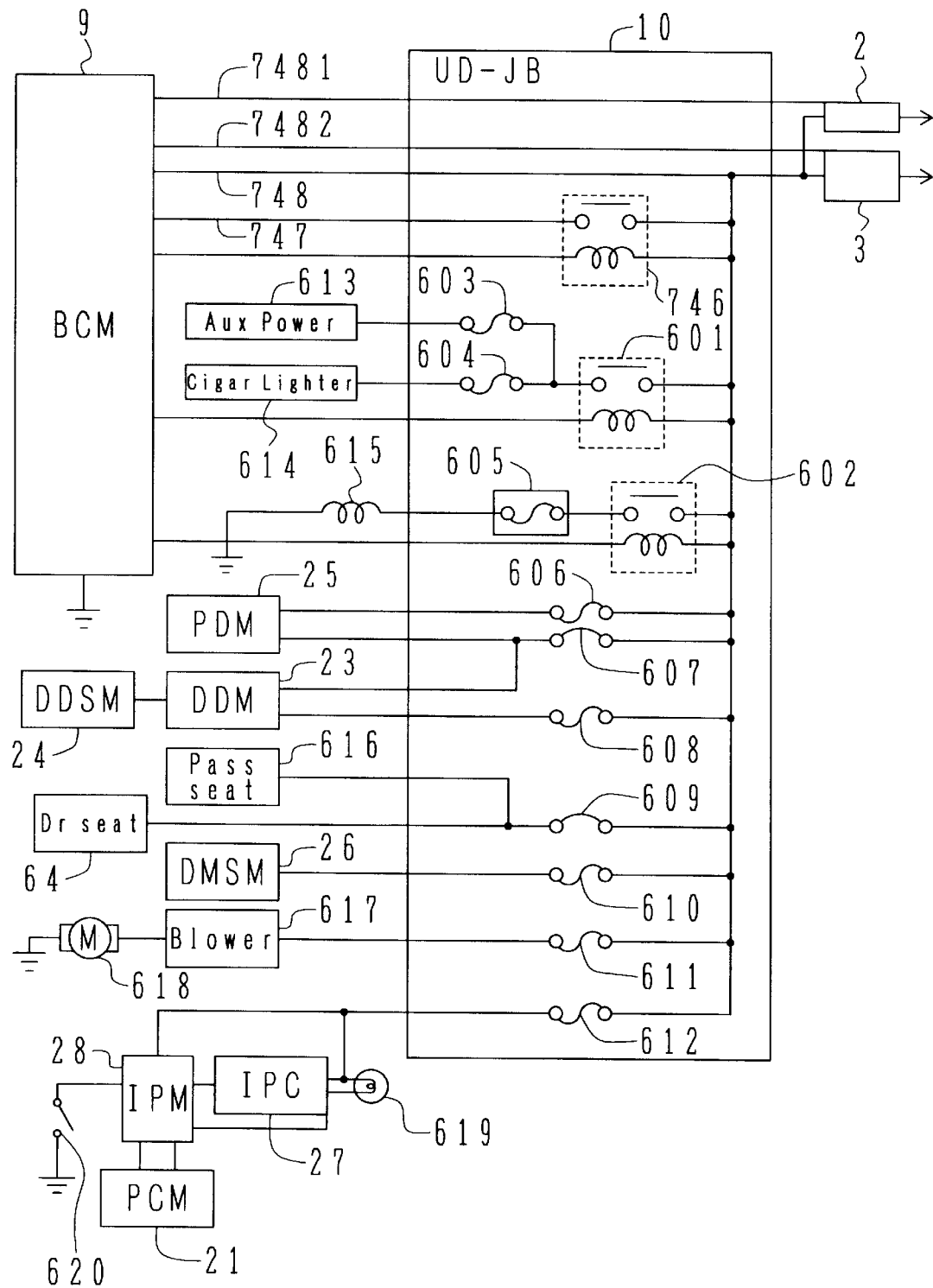
FIG. 7 is a block diagram showing the detailed configuration of an UD-JB used in the power supply network apparatus according to the first embodiment and the loads connected to the UD-JB.

Then the explanation will be with reference to FIG. 7 as to the detailed configuration of the UD-JB 10 used in the power supply network apparatus according to the embodiment and the loads connected to the UD-JB 10.

FIG. 7 is a block diagram showing the detailed configuration of the UD-JB 10 used in the power supply network apparatus according to the embodiment and the loads connected to the UD-JB 10.

Both the power bus 2 supplied with the electric power from the battery and the power bus 3 supplying the electric power to the F-JB 12 are connected to the UD-JB 10, as power supply lines. Each of the power buses 2 and 3 has a short-circuit sensor. The states detected by the short-circuit sensors of the power buses 2 and 3 are taken into the BCM 9 through signal lines 7481 and 7482, respectively. The electric power from the power buses 2 and 3 is used as a power supply for supplying the electric power to the BCM 9 through a normally conductive line (power supply) 748, as a power supply 747 for supplying the electric power to the BCM 9 through a BCM relay 746 for preventing a reverse current at the time of reversely connecting the battery and for driving a coil for the BCM relay, as a power supply for supplying the electric power to a relay 601 which supplies the electric power to a cigar lighter and for driving a relay coil for the relay 601, as a power supply for a relay 602 which drives a parking brake solenoid and for driving a relay coil for the relay 602, as a power supply for the load of the PDM 25 and for controlling the PDM 25, as a power supply for the load of the DDM 23 and for controlling the DDM 23, as a power supply for loads of a driver 64 and a passenger power seat 616, as a power supply for a driver supply for supplying the electric power to a control unit 617 of the blower motor 618 of the air conditioner, as a power supply for supplying the electric power to the air conditioner module IPM 28, as a power supply for supplying the electric power to a meter module IPC 27, and as a power supply for supplying the electric power to an ignition key cylinder lamp 619.

As shown in FIG. 4, since the BCM 9 and the UD-JB 10 are disposed adjacently and configured so as to be connectable and separable to each other, there is no wire harness between the BCM 9 and the UD-JB 10. Alternatively, the BCM 9 and the UD-JB 10 may be configured in a manner that they are integrated so as to not to be separable. In this case, also a wire harness between the FIM 11 and the F-JB 12 can be eliminated. As described later, since the BCM 9 includes therein a function portion for cutting off the power supplied to a load driven by the BCM 9 at the time where the load is short-circuited, it is not necessary to provide within the UD-JB 10 a fuse for the load to be driven by the BCM 9.

Both an auxiliary power supply output 613 and the cigar lighter 614 are coupled to a cigar lighter relay 601 which supplies the electric power to the cigar lighter on the basis of the state of the ignition key. Fuses 603 and 604 are provided in order to prevent the generation of an excessive current at the time of the short-circuit of the corresponding loads. The relay 601 is controlled by the BCM 9. The BCM 9 controls the parking brake relay 602 so as to supply the current to a parking brake solenoid 615. A fuse 605 is provided in order to prevent the generation of an excessive current at the time of the short-circuit of the corresponding load.

The DDM 23 and the PDM 25, which control the power supply to the loads such as a power window motor or the like, use a common line as a power supply line for supplying the electric power to the loads. A circuit breaker 607 is also shared by the left and right modules. The power supply for the control operation of the PDM 25 and the DDM 23 is provided separately for the left and right modules thereby to improve the reliability. Fuses 606, 607 and 608 are provided in order to prevent the generation of an excessive current at the time of the short-circuit of the corresponding loads.

A common line is used for the power supply line for supplying the electric power to the loads of the passenger power seat 616 and the driver breaker 609 is also shared by the left and right side seats. The electric power is directly supplied through a fuse 610 to the DMSM 26 which serves as a memory for the passenger power seat 616. The electric power is directly supplied through a fuse 611 to a blower motor controller 617 for supplying the electric power to an air conditioner blower motor. Similarly, the electric power is directly supplied through a fuse 612 to the instrument panel module IPC 27, the air conditioner module 28, and the ignition key cylinder lamp 619. The output signal of a parking brake switch 620 is taken into the IPM 28.

Figure 8:
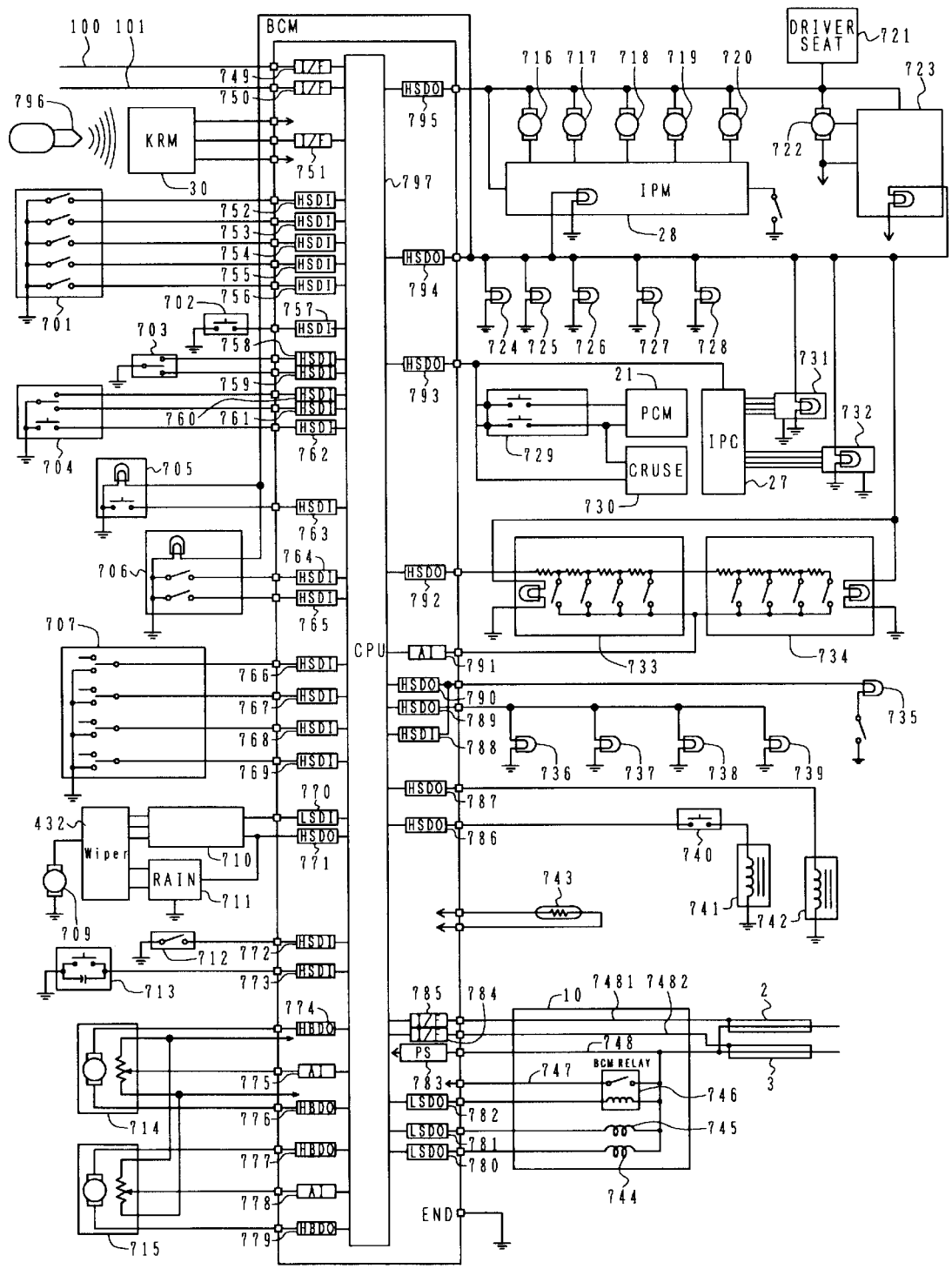
FIG. 8 is a block diagram showing the detailed configuration of a BCM used in the power supply network apparatus according to the first embodiment and the loads and the switches connected to the BCM.

Then the explanation will be with reference to FIG. 8 as to the detailed configuration of the BCM 9 used in the power supply network apparatus according to the embodiment and the loads and the switches connected to the BCM 9.

FIG. 8 is a block diagram showing the detailed configuration of the BCM 9 used in the power supply network apparatus according to the embodiment and the loads and the switches connected to the BCM 9.

Since the BCM 9 serves as a gateway for the multiplexed communication of the body electrical equipment system and the multiplexed communication among other subsystems, the BCM 9 has two multiplexed communication lines 100 and 101. However, if the physical layers of both the multiplexed communication of the body electrical equipment system and the multiplexed communication among other subsystems have the common specification, unlike the embodiment, it is not necessary to provide the multiplexed communication lines separately for these multiplexed communications. Interface circuits 749 and 750 serve to make the signals of the multiplexed communication lines satisfy the specification of the physical layer of the communication, and then the transmission and reception of the data can be performed by a CPU 797.

The KRM 30 is a module for receiving the burglary prevention signal sent from an ignition key 796 in which a burglary prevention device is incorporated. The signal thus received by the KRM 30 is subjected to the waveform shaping by an interface circuit 751, then taken into the CPU 797 and processed by the CPU. The burglary prevention signal is sent to the FIM 11 in the multiplexed communication mode thereby to limit the starting of the starter motor. The ignition switch 701 can be selectively positioned at one of five positions. When the ignition switch 701 is positioned at the five positions, the state of the ignition switch can be monitored by the CPU 797 through input interface circuits 752, 753, 754, 755 and 756, respectively. Then, the CPU 797 transmits the state of the ignition switch thus monitored to other modules in the multiplexed communication mode.

The states of the switches for lamps etc. such as a horn switch 702, a directional lamp switch 703, a head lamp change-over switch 704, a hazard lamp switch 705, a head lamp switch 706 are monitored by the CPU 797 through input processing circuits 757, 758, 759, 760, 761, 762, 763, 764, 765.

The CPU 797 monitors the state of a steering column switch 707, which performs the tilting operation and the telescopic operations of the steering column, through input processing circuits 766, 767, 768 and 769, thereby to operate a tilt motor 714 and a telescopic motor 715 for driving the steering column.

Each of motor driving circuits 774, 776, 777 and 779 is an H-bridge type driving circuit. The motor driving circuit 774, 776, and the motor driving circuit 777, 779 rotate the motors 714, 715 forwardly and reversely in accordance with an instruction from the CPU 797, respectively. Each of the motors 714 and 715 includes therein a potentiometer for position feedback which outputs a position signal. The position signals from the motors 714, 715 are respectively applied to analog interface circuits 775, 778 and subjected to waveform shaping therein, and then taken into the CPU 797 thereby realize the memory function.

An output circuit 771 supplies the electric power to a wiper switch 710 and a rain drop sensor 711. The CPU 797 monitors the state of the switch 710 through an input interface circuit 770. The wiper motor control circuit 432 drives the wiper motor 709 in accordance with the electric power supplied through the wiper switch 710 thereby to control the speed etc. of the wiper. The CPU 797 monitors the states of a VALET switch 712 and a brake switch 713 for a stop lamp through input interface circuits 772, 773, respectively. Then, the CPU 797 monitors the state of the brake switch 713 for the stop lamp thereby to control the lighting of the stop lamp of the RIM in the multiplexed communication mode.

Short-circuit sensors 7481, 7482 are applied with voltages by interface circuits 785, 784 and monitor the voltages, respectively. The monitored voltages are used for estimating the grounding state of the power bus. The normally-turned-on power supply 748 is used for generating a voltage suitable for operating the CPU 797 by a power supply circuit 783 and further generating a wake-up signal for the sleeping state of the system. The coil of a relay 746 and relay coils 744, 745 within the UD-JB 10 are driven by driving circuits 782, 780, 781, respectively.

A low side thermistor 743 measures the temperature of the air conditioner. Driving circuits 786, 787 controls the current supply to a reverse lockout solenoid 742 and a shift lock solenoid 741 on the basis of gear position information etc. sent in the multiplexed communication mode. A brake switch 740 is turned on when a driver depresses the brake pedal thereby to enable to supply the current to the shift lock solenoid 741 to enable to cancel the shift lock state.

A driving circuit 789 drives a left-side roof courtesy lamp 736, a right-side roof courtesy lamp 737, a left-side front door courtesy lamp 738 and a right-side front door courtesy lamp 739. A glove box lamp 735 is driven by a driving circuit 790. Since the glove box lamp 735 is required to be turned on at the time of the sleeping state of the system, a switch input processing circuit 788 is provided.

A driving circuit 792 supplies the electric power to a radio control switch 733 and an air conditioner control switch 734 provided at the steering wheel. Since the resistance values within the switches 733, 734 change in accordance with the on/off sates thereof, respectively, an analog interface circuit 791 is required on the CPU 797 side. An output circuit 793 is provided for supplying the electric power to the IPC 27, a cruise control switch 730 and a brake switch 729.

An output circuit 794 is provided for supplying the electric power to and for adjusting the light of illumination lamps of the respective switches, that is, switches 731 and 732 at the left and right portions of the instrument panel, a gear position switch 724, a TCS switch 725, a trunk opener 726, an ashtray 727, a radio 728, a rear air conditioner switch 723, the air conditioner switch module 28, the head lamp switch 706 and the hazard lamp switch 705. A driving circuit 795 supplies the electric power on the basis of the ignition switch information to motors for controlling the air conditioner (that is, a mode motor 716, an air inlet motor 717, a left-side air mix motor 718, a right-side air mix motor 719, a temperature sensor motor 720 and a rear seat air conditioner motor 722) and a driver.

Figure 9:
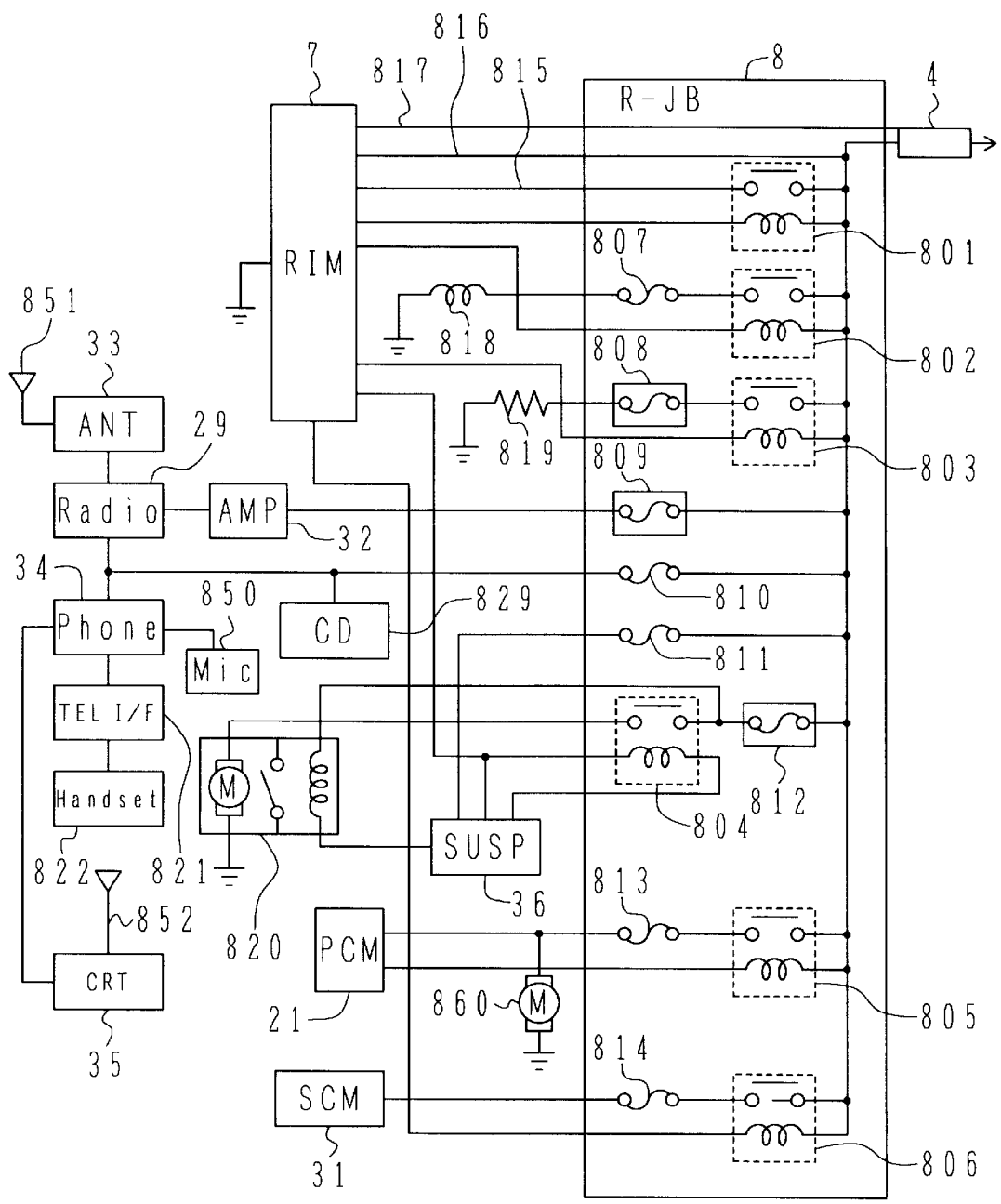
FIG. 9 is a block diagram showing the detailed configuration of an R-JB used in the power supply network apparatus according to the first embodiment and the loads connected to the R-JB.

Then the explanation will be with reference to FIG. 9 as to the detailed configuration of the R-JB 8 used in the power supply network apparatus according to the embodiment and the loads connected to the R-JB 8.

FIG. 9 is a block diagram showing the detailed configuration of the R-JB 8 used in the power supply network apparatus according to the embodiment and the loads connected to the R-JB 8.

The electric power from the power bus 4 is supplied as a power supply 816 of the RIM 7, as a power supply 85 for driving a relay 801 which prevents a reverse current from flowing to the RIM at the time of reversely connecting the battery and for driving a coil for the relay 801, as a power supply for driving a relay 802 which drives a fuel lid opener solenoid 818 and for driving a coil for the relay 802, as a power supply for driving a relay 803 which drives a rear defogger 819 and for driving a coil for the relay 803, as a power supply for driving a relay 804 which drives a suspension control motor 820, as a backup power supply for a suspension control module (unit) 36, as a power supply for driving a relay 805 which drives a fuel pump motor 860 and for driving a coil for the relay 805, as a power supply for driving a relay 806 which drives a sun roof module SCM 31 and for driving a coil for the relay 806, as a power supply for driving the audio amplifier 32, and as a power supply for a CD player 829, the radio 29 and the automobile telephone adapter or circuit 34.

The antenna module 33 is controlled by the radio 29 so as to move an antenna 851 upward and downward. The automobile telephone adapter or circuit 34 is connected to the cellular phone transceiver 35 coupled to an antenna 852, a handset 822 coupled through a telephone interface 821 and a hands-free microphone 850.

Since the RIM 7 and the R-JB 8 are disposed adjacently and configured so as to be connectable and separable to each other, there is no wire harness between the RIM 7 and the R-JB 8. Alternatively, the RIM 7 and the R-JB 8 may be configured in a manner that they are integrated so as not to be separable. In this case, also a wire harness between the RIM 7 and the R-JB 8 can be eliminated.

As described later, since the RIM 7 includes therein a function portion for cutting off the power supplied to a load driven by the RIM 7 at the time where the load is short-circuited, it is not necessary to provide within the R-JB 8 a fuse for the load to be driven by the RIM 7.

A short-circuit sensor 817 is applied with a voltage by an interface circuit within the RIM 7 and monitors the voltage. The monitored voltage is used for estimating the grounding state of the power bus.

In order to prevent the excessive current at the time of the short-circuit of the respective loads, the fuel lid opener solenoid is provided with a fuse 807, the rear defogger 819 is provided with a fusible link 808, the audio amplifier 32 is provided with a fusible link 809, the radio 29 etc. are provided with a fuse 810, the suspension control module 36 is provided with a fuse 811, the suspension control motor 820 is provided with a fusible link 812, the fuel pump motor 860 is provided with a fuse 813 and the sun roof module SCM 31 is provided with a fuse 814.

Figure 10:
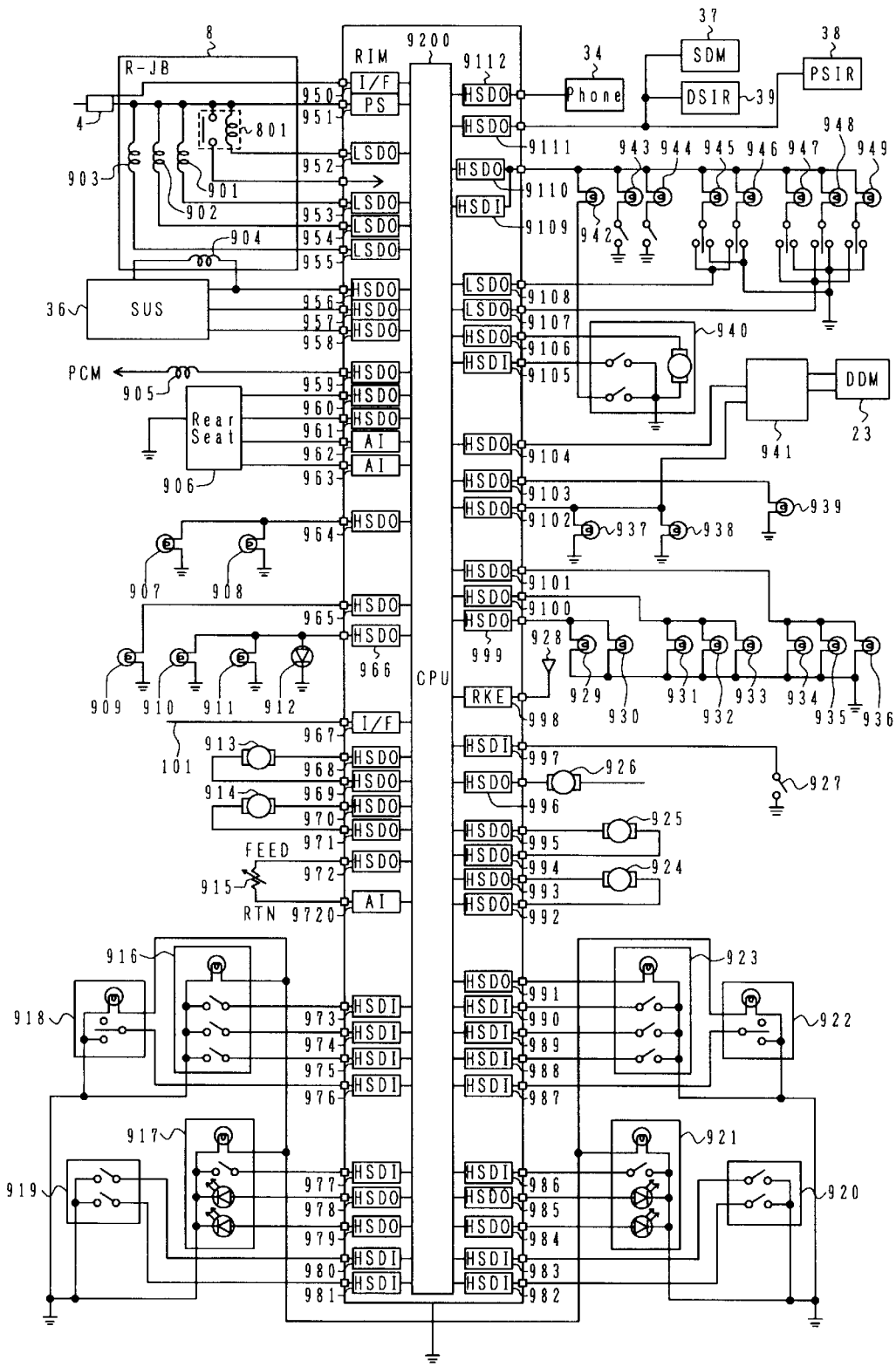
FIG. 10 is a block diagram showing the detailed configuration of an RIM used in the power supply network apparatus according to the first embodiment and the loads and the switches connected to the RIM.

Then the explanation will be with reference to FIG. 10 as to the detailed configuration of the RIM 7 used in the power supply network apparatus according to the embodiment and the loads and the switches connected to the RIM 7.

FIG. 10 is a block diagram showing the detailed configuration of the RIM 7 used in the power supply network apparatus according to the embodiment and the loads and the switches connected to the RIM 7.

A short-circuit sensor 817 shown in FIG. 9 is applied with a voltage by an interface circuit 950 shown in FIG. 10 and monitors the voltage. The monitored voltage is used for estimating the grounding state of the power bus. The normally-turned-on power supply 816 shown in FIG. 9 is used for generating a voltage suitable for operating a CPU 9200 by a power supply circuit 951 and further generating a wake-up signal for the sleeping state of the system.

The coil of the relay 801 within the R-JB 8 and coils 901, 902 and 903 are driven by driving circuits 952, 953, 954 and 955, respectively. Driving circuits 956, 957 and 958 supply current to the suspension control module (unit) 36 and a relay 904. A driving circuit 959 supplies the electric power to a canister solenoid 905. Driving circuits 960, 961 respectively supply the electric power to the left and right rear seat heaters of a rear seat assembly 906. The outputs of NTC thermistors for measuring the temperatures of the rear seat are applied to the CPU 9200 through left and right analog input interfaces 962, 963, respectively.

A driving circuit 964 supplies the electric power to and controls courtesy lamps 907, 908 of left-side and right-side rear doors. Output driving circuits 966, 965, 9103, 9102, 999, 9100, 9101 control in the multiplexed communication mode the lamps, that is, left and right side brake lamps 910, 911, a high mount stop lamp 912, left and right side directional lamps 909, 939, left and right side back lamps 937, 938, license lamps 929, 930 and left and right side tail lamps 931, 932, 933, 934, 935, 936. The multiplexed communication line 101 is connected to a communication interface 967.

Since the rear doors are controlled by the RIM 7, left and right side power window motors 913, 925 and left and right side door lock motors 914, 924 are driven by H-bridge type driving circuit 968, 969, 995, 994, 970, 971, 992, 993, respectively.

A lock and unlock signal for the doors and upward/downward moving signal of the windows from the driver communication mode. The outputs of lock switches 918, 922 of the left and right side rear doors, power window switches 916, 923 (up/down, one-touch down), rear seat heater switches 917, 921 and wedge switches 919, 920 of the left and right side doors are inputted into the RIM 7 through input processing circuits 973, 974, 975, 976, 977, 980, 981, 082, 983, 986, 987, 988, 989, 990.

Driving circuits 978, 979, 984, 985 drive seat temperature indication lamps contained within left and right side seat heater switches 917, 921, respectively. A driving circuit 991 drives so as to illuminate the lock switches 918, 922 of the left and right side doors, the power window switches 916, 923 (up/down, one-touch down) and the rear seat heater switches 917, 921.

A fuel sensor 915 for a fuel meter is supplied with the electric power from a power supply circuit 972 and outputs a signal representing a fuel amount to the CPU 9200 through an analog interface circuit 9720. The blower motor 926 of the rear air conditioner is supplied with the electric power from an output circuit 996. The state of a trunk opener inhibition switch 972 is taken into the CPU 9200 through an input interface circuit 997 and monitored by the CPU. The RIM 7 contains the tuner 998 of a keyless entry system therein. An antenna 928 for the tuner 998 is provided at the external of the RIM 7 and connected to the tuner.

An electric-type glare-proof mirror 941 is supplied with the electric power from an output circuit 9104. A reverse signal for the glare-proof mirror is supplied thereto through an output circuit 9102 on the basis of a driving signal of the backup lamp. An electric-type trunk opener 940 is driven by a driving circuit 9106. The information of switches (a lamp switch and an open switch) within an actuator 940 is inputted into the CPU 9200 through an interface 9105. Rail lamps 945, 946 and courtesy lamps 947, 948, 949 are driven by driving circuits 9108, 9107, respectively.

A driving circuit 9110 supplies the electric power to a trunk room lamp 942, left and right side vanity mirror lamps 943, 944, the left and right side rail lamps 945, 946, and the overhead courtesy lamps 947, 948, 949. A switch input interface circuit 9109 is provided since it is necessary to wake up these lamps by using the switches associated thereto at the time of the system sleeping state. An output circuit 9111 selectively supplies the electric power to the air bag control unit 37, the driver unit 39 and the passenger seat side air bag module or module 38 in accordance with the position of the ignition key. An output circuit 9112 supplies the electric power to the automobile telephone adapter or unit 34.

As described above, the aforesaid embodiment is arranged in a manner that the battery 1 disposed at the rear portion side of the vehicle is coupled through the power bus 4 to the R-JB 8 and the RIM 7 serving as the power supply center near the rear seat, the battery 1 is further coupled through the power bus 2 to the UD-JB 10 and the BCM 9 serving as the power supply center near the center portion of the vehicle, the battery 1 is further coupled through the power bus 3 to the F-JB 12 and the FIM 11 serving as the power supply center at the front side of the vehicle, and the battery 1 is furthermore continuously coupled through the power supply lines 5, 6 to the starter motor 13 and the alternator 14, respectively. Accordingly, even if the battery is disposed at the rear portion of the vehicle, since it is not necessary to directly couple the battery to the starter motor and the alternator by means of thick and long cables, it is possible to prevent the number of the wires from increasing and the wire harness from being thicker in the vehicle.

Further, since the driving information signals of the respective electric loads is transmitted in the multiplexed communication mode, the number of the wires can also be reduced. As a result, the embodiment is advantageous in that the wire harness can be further prevented from being thicker in the vehicle.

A power supply network apparatus according to a second embodiment of the present invention will be explained with reference to FIG. 11. In the figure, like parts corresponding to those of FIG. 1 are marked with the same references and therefor need not be described.

Figure 11:
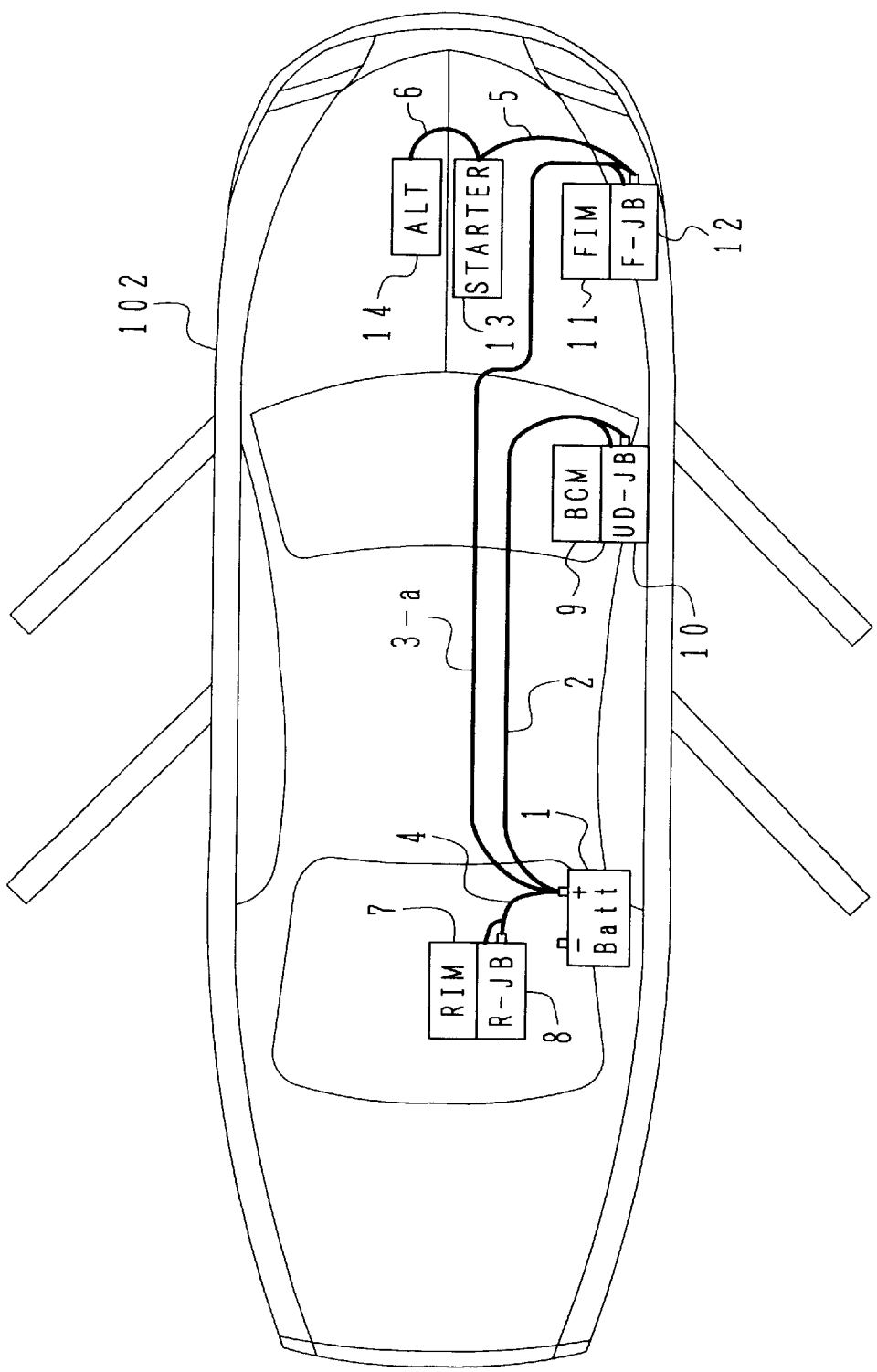
FIG. 11 is a block diagram showing the arrangement of the power supply center in the power supply network apparatus according to a second embodiment of the present invention.

FIG. 11 is a block diagram showing the arrangement of the power supply center in the power supply network apparatus according to the second embodiment.

In this embodiment, a battery 1 is disposed at the portion beneath the rear seat of a vehicle 102. Alternatively, the battery 1 may be disposed within a trunk room of the vehicle 102.

The positive electrode of the battery 1 is connected through a power bus 4 for power supply to a rear junction block (R-JB) 8 having fuses and relays for driving large-current loads. A rear integration module (RIM) 7 serves to control the input operations of the switches of the trunk room and both rear doors and also control the driving operations of the loads of the electric equipments thereof. The RIM 7 is disposed in adjacent to the R-JB 8 and can be coupled to the R-JB 8 through a plug-in operation. The R-JB 8 and the RIM 7 constitute the power supply center for the loads in the vicinity of the rear seat.

The positive electrode of the battery 1 is also connected through a power bus 2 for power supply to an under dash junction block (UD-JB) 10 serving as a fuse relay block. A body control module (BCM) 9 serves to control the input operations of the switches and the driving operations of the loads of the electric equipments of a cabin. The BCM 9 is disposed in adjacent to the UD-JB 10 and can be coupled to the UD-JB 10 through a plug-in operation. The UD-JB 10 and the BCM 9 constitute the power supply center for the loads around the cabin in the vicinity of the center portion of the vehicle.

The positive electrode of the battery 1 is also connected through a power bus 3-a for power supply to a fuse relay block (F-JB) 12 disposed within the engine room. An FIM 11 serves to control the input operations of the switches and the driving operations of the loads of the electric equipments within the engine room. The FIM 11 is disposed in adjacent to the F-JB 12 and can be coupled to the FIM 11 through a plug-in operation. The F-JB 12 and the FIM 11 constitute the power supply center for the loads around the cabin in the engine room at the front portion of the vehicle.

The power bus connection terminal of the F-JB 12 is continuously connected to a starter motor 13 and an alternator 14 through power supply lines 5, 6.

As described above, unlike the embodiment shown in FIG. 1, the present embodiment is arranged in a manner that the UD-JB 10 and the BCM 9 constituting the power supply center for the loads around the cabin in the vicinity of the center portion of the vehicle are supplied with the electric power through another power bus, in particular, the power bus 2 separated from the starter motor 13 and the alternator 14. Accordingly, the power supply center is hardly influenced by the ripple voltage generated from the starter motor 13 and the alternator 14 and sot the reliability of the power supply network apparatus can be improved.

Further, since the plurality of the power supply centers are mutually coupled by the power buses, even if the battery is disposed at the rear portion of the vehicle, it is not necessary to directly couple the battery to the starter motor and the alternator by means of thick and long cables, so that it is possible to prevent the number of the wires from increasing and the wire harness from being thicker in the vehicle.

Further, since the driving information signals of the respective electric loads is transmitted in the multiplexed communication mode, the number of the wires can also be reduced. As a result, the embodiment is advantageous in that the wire harness can be further prevented from being thicker in the vehicle.

Then, a power supply network apparatus according to a third embodiment of the present invention will be explained with reference to FIG. 12. In the figure, like parts corresponding to those of FIG. 1 are marked with the same references and therefor need not be described.

Figure 12:
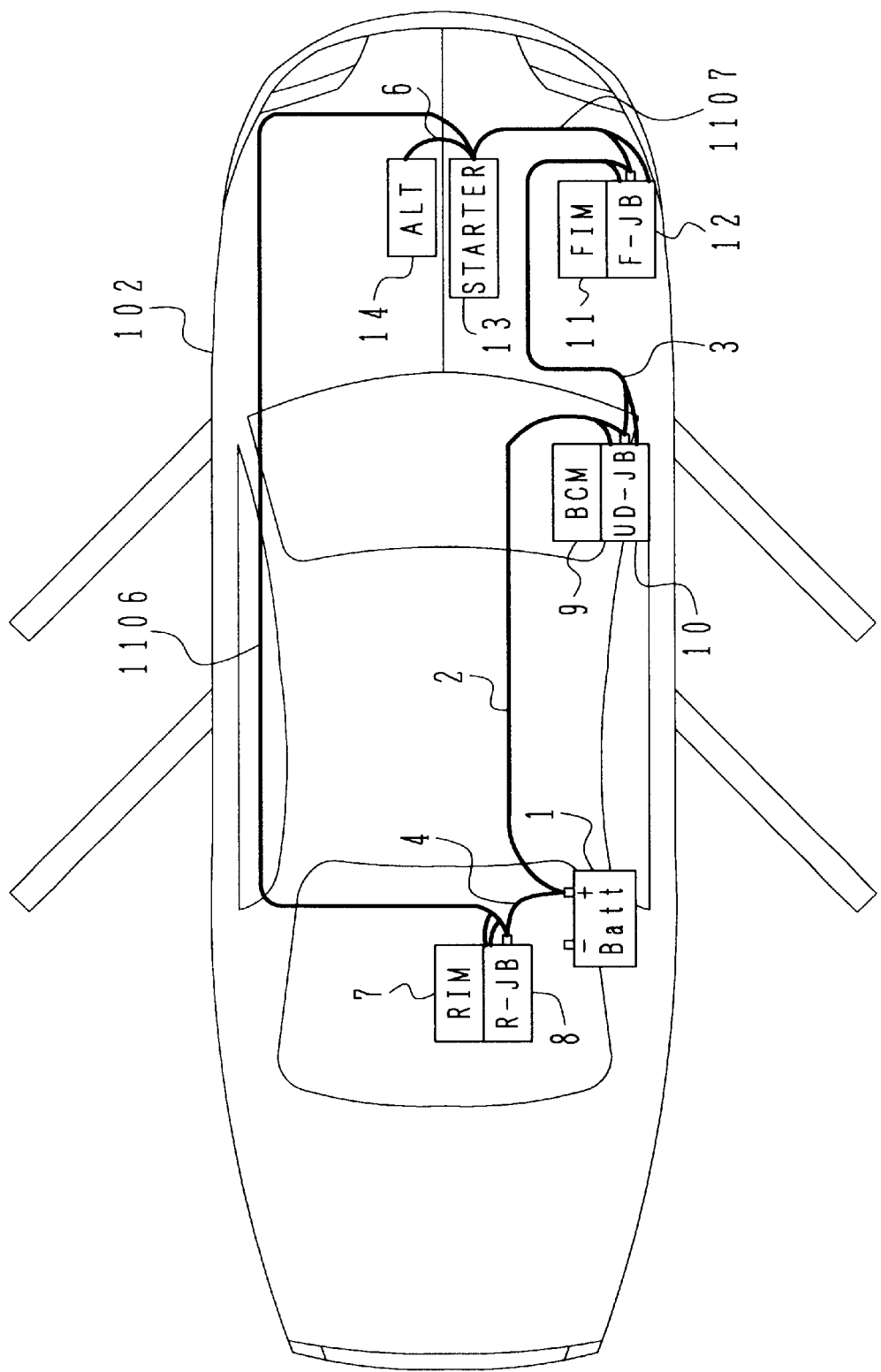
FIG. 12 is a block diagram showing the arrangement of the power supply center in the power supply network apparatus according to a third embodiment of the present invention.

FIG. 12 is a block diagram showing the arrangement of the power supply center in the power supply network apparatus according to the third embodiment.

In this embodiment, a battery 1 is disposed at the portion beneath the rear seat of a vehicle 102. Alternatively, the battery 1 may be disposed within a trunk room of the vehicle 102.

The positive electrode of the battery 1 is connected through a power bus 4 for power supply to a rear junction block (R-JB) 8 serving as a fuse relay bock having fuses and relays for driving large-current loads. A rear integration module (RIM) 7 serves to control the input operations of the switches of the trunk room and both rear doors and also control the driving operations of the loads of the electric equipments thereof. The RIM 7 is disposed in adjacent to the R-JB 8 and can be coupled to the R-JB 8 through a plug-in operation. The R-JB 8 and the RIM 7 constitute the power supply center for the loads in the vicinity of the rear seat.

The positive electrode of the battery 1 is also connected through a power bus 2 for power supply to an under dash junction block (UD-JB) 10 serving as a fuse relay block. A body control module (BCM) 9 serves to control the input operations of the switches and the driving operations of the loads of the electric equipments of a cabin. The BCM 9 is disposed in adjacent to the UD-JB 10 and can be coupled to the UD-JB 10 through a plug-in operation. The UD-JB 10 and the BCM 9 constitute the power supply center for the loads around the cabin in the vicinity of the center portion of the vehicle.

The power bus connection terminal of the UD-JB 10 is coupled through a bus for power supply to a fuse relay block F-JB12 disposed within the engine room. An FIM 11 serves to control the input operations of the switches and the driving operations of the loads of the electric equipments within the engine room. The FIM 11 is disposed in adjacent to the F-JB 12 and can be coupled to the FIM 11 through a plug-in operation. The F-JB 12 and the FIM 11 constitute the power supply center for the loads around the cabin in the engine room at the front portion of the vehicle.

The power bus connection terminal of the F-JB 12 is connected to a starter motor 13 through a power supply line 1107 and further connected to an alternator 14 through a power supply line 6 from the starter.

In this manner, in the embodiment, the power buses 4, 2, 3, 1107 and 1106 are arranged in a loop-shape, so that the resistance value of the wires can be reduced entirely.

As described above, the present embodiment is arranged in a manner that the plurality of the power supply centers are mutually coupled by the power buses, even if the battery is disposed at the rear portion of the vehicle, it is not necessary to directly couple the battery to the starter motor and the alternator by means of thick and long cables, so that it is possible to prevent the number of the wires from increasing and the wire harness from being thicker in the vehicle.

Further, since the driving information signals of the respective electric loads is transmitted in the multiplexed communication mode, the number of the wires can also be reduced. As a result, the embodiment is advantageous in that the wire harness can be further prevented from being thicker in the vehicle.

Furthermore, since the power buses are arranged in a loop-shape, the resistance value of the wires can be reduced entirely.

Accordingly, according to the present invention, even if the battery is disposed at the position away from the engine room such as a position within the trunk room, a position beneath the rear seat or the like, the number of the wires can be reduced and the wire harness can be prevented from being thicker in the vehicle.

What is claimed is:

1. A power supply network apparatus in a vehicle having a battery mounted at a position remote from an engine compartment of the vehicle, said apparatus comprising:
   a plurality of power supply centers disposed at locations dispersed about the vehicle, including, a first power supply center which is disposed near a dashboard of the vehicle, detects conditions of at least a key-switch of the vehicle and provides a power supply for loads situated about a passenger compartment near a center portion of the vehicle, and a second power supply center which is disposed within said engine compartment, controls a power supply to a starter motor of the vehicle, and provides a power supply for loads situated about said engine compartment, at a front portion of the vehicle;
   a power bus for supplying electric power from said battery to said first power supply center, supplying electric power from said first power supply center to said second power supply center and supplying electric power from said second power supply center to said starter; and
   a communication line connected between said first and second power supply centers for sending and receiving signals between them; wherein
      said second power supply center includes a control circuit module and a fuse relay block portion, said control circuit module comprising a control portion, an input/output connector portion and an output driver portion, and said fuse relay block portion being electrically connected to said input/out connector portion of said control circuit module;
      said first power supply center detects when said key-switch is positioned at a starter position, and supplies a starter position detecting signal to said control portion of said control circuit module via said communication line; and
   in response to receipt of said starter position detecting signal, said control portion drives said output driver portion to turn on electricity to a starter relay of said fuse relay block portion, whereby said second power supply center supplies electric power to said starter through a relay contact and a fuse.

2. A power supply network apparatus according to claim 1, wherein each of said power supply centers comprises a control circuit module having a semiconductor switching element serving as a load driving means, and a fuse relay block having a relay serving as a load driving means.

3. A power supply network apparatus according to claim 2, wherein, in each of said power supply centers, said control circuit module and said fuse relay block are connectable to and separable from each other by means of a connector.

4. A power supply network apparatus according to claim 2, wherein said fuse relay block includes a protection means for protecting a load at a time of short-circuit of the load and at a time where a power supply line to the load is short-circuited to ground.

5. A power supply network apparatus according to claim 2, wherein a driving signal is sent to said load driving means in a multiplexed communication mode.

6. A power supply network apparatus in a vehicle, comprising:
   a battery disposed at a rear portion of said vehicle;
   a starter motor disposed at a front portion of said vehicle; and
   a power supply center which is disposed at a front portion of said vehicle, and controls electric power supply from said battery to said starter motor; wherein
   said power supply center comprises a control circuit having a communication function, and a control relay which electrically energizes said starter motor; and
   said control relay is controlled by a driving signal generated from said control circuit in response to receipt via said communication function, of a starter position detection signal indicating that a key switch of said vehicle is placed in a starter position.

7. The power supply network apparatus according to claim 6, wherein said control relay which energizes said starter motor is controlled by said driving signal from said control circuit and a signal generated from a gear position switch disposed at a transmission of said vehicle.

8. The power supply network apparatus according to claim 6, wherein a circuit breaker is connected in series with said control relay which energizes said starter motor.

9. The power supply network apparatus according to claim 6, wherein:

said control circuit controls an output and termination of a driving signal to said control relay which energizes said starter motor, based on a status detecting signal of an ignition switch sent from another controlling element via a communication function.

10. The power supply network apparatus according to claim 6, wherein:

said control relay which energizes said starter motor is controlled by said driving signal from said control circuit and a signal generated from a gear position switch disposed at a transmission; and a circuit breaker is connected in series with said control relay.

11. The power supply network apparatus according to claim 6, wherein:

said control relay which energizes said starter motor is controlled by said driving signal from said control circuit and a signal generated from a gear position switch disposed at a transmission of said vehicle;

a circuit breaker is connected in series with said control relay; and said control circuit controls an output and termination of a driving signal to said control relay, based on a status detecting signal of an ignition switch sent from another controlling element via a communication function.

12. A power supply center apparatus in a power supply network, comprising:

a relay block including an input terminal for a battery power supply, an output terminal for a starter motor and a control relay connected between said input terminal and said output terminal for supplying electric power to said starter motor; and a control circuit having a communication function;

wherein said control circuit controls an output and termination of a driving signal to said control relay for supplying electric power to said starter motor, based on a status detecting signal of an ignition switch sent from another power supply center via said communication function.

13. The power supply center apparatus according to claim 12, wherein said control relay of said starter motor is controlled by said driving signal from said control circuit and a signal generated from a gear position switch disposed at a transmission.

14. The power supply center apparatus according to claim 12, wherein a circuit breaker is connected in series to said control relay of said starter motor.

15. The power supply center apparatus according to claim 12, wherein said control relay of said starter motor is controlled by said driving signal from said control circuit and a signal generated from a gear position switch disposed at a transmission; and a circuit breaker is connected in series with said control relay of said starter motor.

16. The power supply center apparatus according to claim 12, wherein:

said control relay of said starter motor is controlled by said driving signal from said control circuit and a signal generated from a gear position switch disposed at a transmission;

a circuit breaker is connected in series with said control relay of said starter motor;

said control circuit controls an output and termination of a driving signal to said control relay of said starter motor, based on a status detecting signal of an ignition switch sent from another controlling element via a communication function.

\* \* \* \* \*